United States Patent
Loureiro Ximenes et al.

(10) Patent No.: US 11,505,753 B2
(45) Date of Patent: Nov. 22, 2022

(54) PROCESS OF COPROCESSING A LIGNOCELLULOSIC LIQUID STREAM AND AN INTERMEDIATE FOSSIL STREAM IN AN OIL REFINING PROCESS AND A PROCESS FOR PRODUCING FUEL FROM A DEASPHALTED OIL STREAM

(71) Applicant: PETRÓLEO BRASILEIRO S.A.—PETROBRAS, Rio de Janeiro (BR)

(72) Inventors: Vitor Loureiro Ximenes, Rio de Janeiro (BR); Paulo Cesar Peixoto Bugueta, Rio de Janeiro (BR); Marlon Brando Bezzera De Almeida, Rio de Janeiro (BR); Marco Antonio Gomes Teixeira, Niteroi (BR); Fabio Leal Mendes, Rio de Janeiro (BR); Andrea De Rezende Pinho, Rio de Janeiro (BR); Alexander Rangel Bastos, Rio de Janeiro (BR); Adriano Do Couto Fraga, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 17/260,931

(22) PCT Filed: Jul. 16, 2019

(86) PCT No.: PCT/BR2019/050276
§ 371 (c)(1),
(2) Date: Jan. 15, 2021

(87) PCT Pub. No.: WO2020/014760
PCT Pub. Date: Jan. 23, 2020

(65) Prior Publication Data
US 2021/0348068 A1 Nov. 11, 2021

(30) Foreign Application Priority Data
Jul. 17, 2018 (BR) .......................... 1020180145789

(51) Int. Cl.
*C10G 21/00* (2006.01)
*C10G 11/18* (2006.01)
(Continued)

(52) U.S. Cl.
CPC .......... *C10G 21/003* (2013.01); *C10G 11/182* (2013.01); *C10G 21/14* (2013.01);
(Continued)

(58) Field of Classification Search
CPC .... C10G 21/003; C10G 11/182; C10G 21/14; C10G 21/28; C10G 21/30; C10G 55/04;
(Continued)

(56) References Cited

U.S. PATENT DOCUMENTS 9,447,350 B2 * 9/2016 Ramirez-Corredores .................. C10L 1/19
2012/0022307 A1 * 1/2012 Yanik ....................... C10G 1/08 422/600

(Continued)

FOREIGN PATENT DOCUMENTS

| CA | 2662059 | 11/2009 |
|---|---|---|
| CA | 2819903 | 7/2012 |

(Continued)

OTHER PUBLICATIONS https://web.archive.org/web/20090329225043/https://www.concoa.com/propane_properties.html (Year: 2009).*

(Continued)

*Primary Examiner* — Randy Boyer
*Assistant Examiner* — Juan C Valencia
(74) *Attorney, Agent, or Firm* — Mintz Levin Cohn Ferris Glovsky and Popeo, P.C.

(57) ABSTRACT

The present invention describes the coprocessing of a lignocellulosic liquid stream and an intermediate fossil stream in the oil refining process comprising the steps of (a) contacting said intermediate fossil stream and said lignocellulosic liquid stream with a stream of solvent of $C_3$-$C_{10}$ hydrocarbons in an extraction section, obtaining a stream of extract (Continued)

with solvent and a stream of raffinate with solvent; and (b) sending said stream of extract with solvent to a separation section, obtaining a deasphalted oil stream comprising solvent-free carbon of renewable origin and a stream of recovered solvent. The present invention further relates to a process for producing fuels from the deasphalted oil stream comprising carbon of renewable origin, wherein the process comprises sending the deasphalted oil stream to a conversion section of an oil refinery. The conversion section is selected from catalytic hydrocracking unit, thermal cracking, fluidized-bed catalytic cracking, visbreaking, delayed coking and catalytic reforming.

21 Claims, 3 Drawing Sheets

(51) Int. Cl.
  *C10G 21/14* (2006.01)
  *C10G 21/28* (2006.01)
  *C10G 21/30* (2006.01)
  *C10G 55/04* (2006.01)

(52) U.S. Cl.
  CPC ............. *C10G 21/28* (2013.01); *C10G 21/30* (2013.01); *C10G 55/04* (2013.01); *C10G 2300/1003* (2013.01); *C10G 2300/1014* (2013.01); *C10G 2300/1077* (2013.01); *C10G 2300/206* (2013.01); *C10G 2300/4006* (2013.01); *C10G 2300/4081* (2013.01); *C10G 2300/44* (2013.01); *C10G 2400/02* (2013.01); *C10G 2400/04* (2013.01); *C10G 2400/06* (2013.01)

(58) Field of Classification Search
  CPC .... C10G 2300/1003; C10G 2300/1014; C10G 2300/1077; C10G 2300/206; C10G 2300/4006; C10G 2300/4081; C10G 2300/44; C10G 2400/02; C10G 2400/04; C10G 2400/06; C10G 51/06
  See application file for complete search history.

(56) References Cited

U.S. PATENT DOCUMENTS

2013/0026063 A1* 1/2013 Gillis ..................... C10G 45/00
                                                                  208/44
2016/0304794 A1* 10/2016 Majcher ............ C10G 67/0463

FOREIGN PATENT DOCUMENTS

| CN | 103122257 | 5/2013 |
| WO | WO 2008081100 | 7/2008 |
| WO | WO 2012092468 | 7/2012 |
| WO | WO 2020014760 | 1/2020 |

OTHER PUBLICATIONS

McLinden et al., A Liquid Density Standard Over Wide Ranges of Temperature and Pressure Based on Toluene, 2008, Journal of Research of the National Institute of Standards and Technology, 113, 29-67 (Year: 2008).*
International Search Report and Written Opinion in International Application No. PCT/BR2019/050276, dated Aug. 9, 2019, 13 pages (English Abstract).

* cited by examiner

PROCESS OF COPROCESSING A LIGNOCELLULOSIC LIQUID STREAM AND AN INTERMEDIATE FOSSIL STREAM IN AN OIL REFINING PROCESS AND A PROCESS FOR PRODUCING FUEL FROM A DEASPHALTED OIL STREAM

CROSS-REFERENCE TO RELATED APPLICATIONS

This application is a U.S. national phase filing under 35 U.S.C. § 371 of International Application No. PCT/BR2019/050276, filed Jul. 16, 2019 and claims priority to Brazilian Application No. 102018014578-9, filed Jul. 17, 2018. The entire contents of the prior applications are incorporated herein by reference in their entity.

FIELD OF THE INVENTION

The present invention relates to the coprocessing of a lignocellulosic liquid stream and an intermediate fossil stream in oil refineries.

Furthermore, the present invention relates to a process for producing fuels from a deasphalted oil stream comprising carbon of renewable origin.

BACKGROUND OF THE INVENTION

Mitigation of the problems resulting from the use of fossil fuels is being achieved by increasing the proportion of fuels of renewable origin in countries' energy matrix, stimulated by the public policy of incentivizing the use mainly of ethanol and biodiesel as more sustainable alternatives.

In recent years, sources of lignocellulosic material have opened up new possibilities for this scenario. It was found that lignocellulosic material, which hitherto was regarded as a process waste, can be used as a raw material for producing biofuels. In this way the economics of products of renewable origin is improved, adding value to the materials.

In this context, besides second-generation alcohol obtained, for example, by hydrolysis and fermentation of lignocellulosic material, thermochemical processes for converting lignocellulosic biomass are emerging as an interesting alternative for generating renewable streams.

Among the existing thermochemical processes for converting biomass, we may mention the processes of fast pyrolysis, slow pyrolysis (carbonization) and gasification. These processes are differentiated by the amount of oxygen available in the reaction mixture, residence time, reaction temperature and heating rate.

In particular, the process of fast pyrolysis of biomass stands out among the other processes for converting lignocellulosic material, since it gives higher yields in the generation of a liquid product.

The liquid product resulting from this process is called bio-oil or pyrolysis oil and has various oxygen-containing functional groups in its composition, resulting in an oxygen content in the range from 15 to 50%. However, this chemical characteristic results in undesirable properties that make it difficult to use bio-oil directly as a motor fuel, such as high acidity, low calorific value and chemical instability.

An alternative for using this pyrolysis oil with the aim of increasing the renewability of the energy matrixes is the combined processing of lignocellulosic biomass streams and fossil streams in existing units in oil refineries.

In this connection, some documents of the prior art describe the coprocessing of pyrolysis oil with intermediate streams from oil refining. These processes aim to overcome the problems associated with the resultant composition of the bio-oil, thus making it viable to use it as fuel.

The patent document CA 2819903 discloses a process for producing renewable biofuels based on the direct integration of a system for producing bio-oil and a conventional oil refinery, in which the renewable stream is coprocessed with the stream derived from petroleum.

This process includes the treatment of a mixed stream (bio-oil and fossil components) in a hydrofining unit, and then sending it to units for fluidized-bed catalytic cracking (FCC).

The document CA 2662059 describes a method for processing asphaltenes using a deasphalting solvent. After the deasphalting process, separate fractions are obtained of deasphalted oil and of asphaltene-rich oil. The asphaltene-rich stream can be mixed with a biomass stream with the aim of coprocessing the fossil stream with the renewable stream in a gasifier.

However, the direct use of bio-oil in refining processes has limitations relating to the percentage of bio-oil in the feed to be processed.

The main causes of these limitations are: (i) high value of carbon residue of the bio-oil, which may reach 30 wt % depending on the raw material and the conditions in which the pyrolysis is carried out; (ii) presence of alkali metals and alkaline earth metals in the liquids resulting from the conversion of lignocellulosic biomass, and (iii) formation of water, resulting in the dilution of valuable products.

In fluidized-bed catalytic cracking units (FCC), for example, the limitations as to the direct use of pyrolysis oil are mainly imposed by the increase in the yield of coke and by the rate of deactivation of the catalytic system during cracking.

Therefore the present invention aims to provide the coprocessing of a lignocellulosic liquid stream and a fossil stream in a deasphalting unit so as to overcome the limitations on feed to be introduced in conversion processes at oil refineries.

SUMMARY OF THE INVENTION

The present invention relates to the coprocessing of a lignocellulosic liquid stream and an intermediate fossil stream in the oil refining process.

The coprocessing described here comprises the following steps:

(a) contacting the intermediate fossil stream and said lignocellulosic liquid stream with a stream of solvent of $C_3$-$C_{10}$ hydrocarbons in an extraction section, obtaining a stream of extract with solvent and a stream of raffinate with solvent; and (b) sending the stream of extract with solvent to a separation section, obtaining a deasphalted oil stream comprising solvent-free carbon of renewable origin and a stream of recovered solvent.

The extraction section is a deasphalting unit of an oil refinery.

Moreover, the present invention also relates to a process for producing fuels from the deasphalted oil stream comprising carbon of renewable origin.

The process comprises sending the deasphalted oil stream to a conversion section of oil refineries.

The conversion section is selected from catalytic hydrocracking unit, hydrofining, thermal cracking, fluidized-bed catalytic cracking, visbreaking, delayed coking and catalytic reforming.

BRIEF DESCRIPTION OF THE FIGURES

The detailed description presented hereunder refers to the appended figures, where.

DETAILED DESCRIPTION OF THE INVENTION

The present invention relates to a coprocessing of a lignocellulosic liquid stream and an intermediate fossil stream in the oil refining process.

Figure 1:
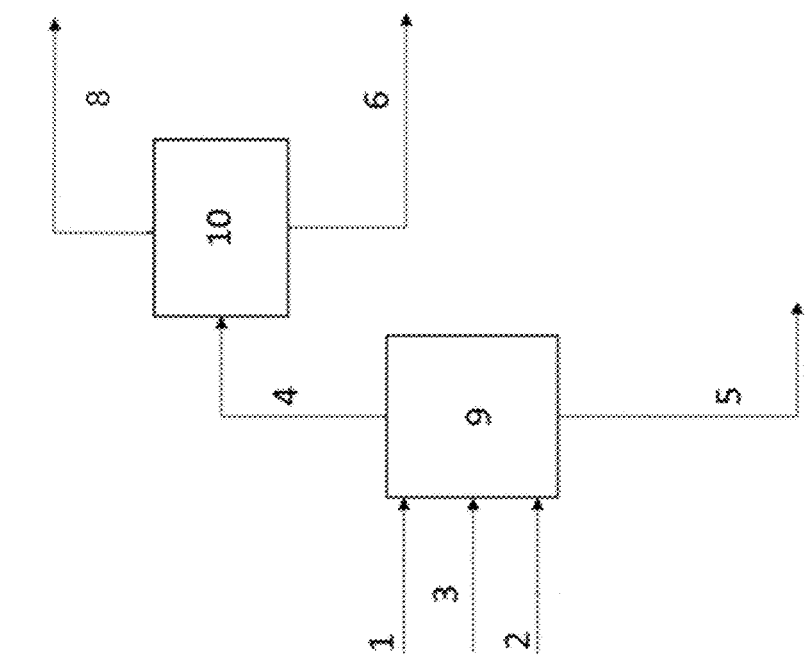
FIG. 1 shows a schematic flowchart of the coprocessing of a lignocellulosic liquid stream and an intermediate fossil stream in the oil refining process.

The coprocessing claimed, as demonstrated in FIG. 1, comprises the following steps:

(a) contacting the intermediate fossil stream 1 and the lignocellulosic liquid stream 2 with a stream of solvent of $C_3$-$C_{10}$ hydrocarbons 3 in an extraction section 9, obtaining a stream of extract with solvent 4 and a stream of raffinate with solvent 5, in which the extraction section is a deasphalting unit; and (b) sending the stream of extract with solvent to a separation section, obtaining a deasphalted oil stream 6 comprising solvent-free carbon of renewable origin and a stream of recovered solvent 8.

Figure 2:
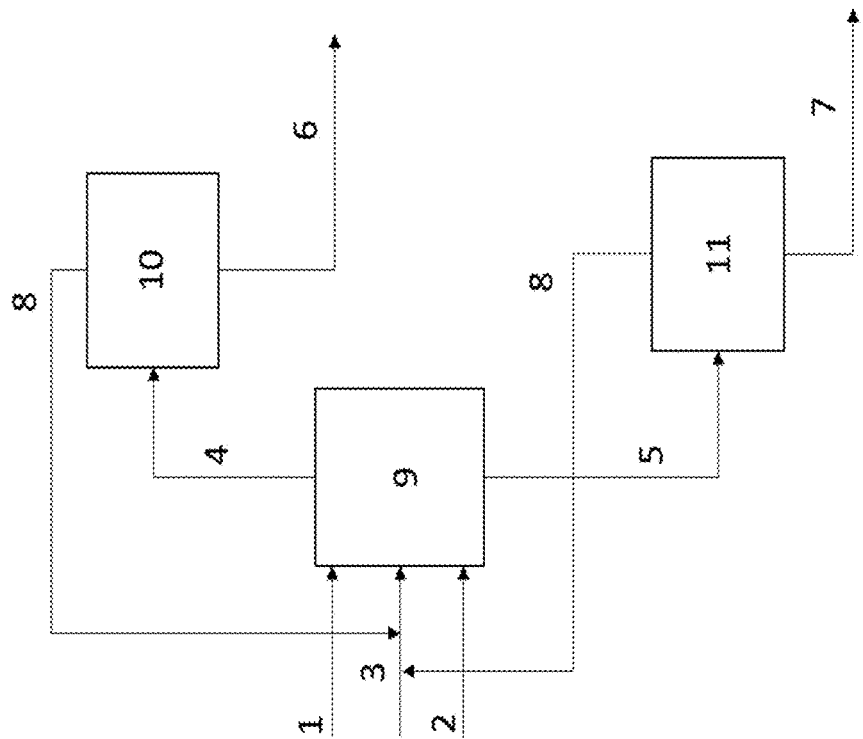
FIG. 2 shows a schematic flowchart of an embodiment of the coprocessing of a lignocellulosic liquid stream and an intermediate fossil stream in the oil refining process, with solvent recycling.

FIG. 2 presents an embodiment in which the coprocessing comprises a step (c). Said step relates to the separation of the stream of raffinate with solvent 5 into a stream of recovered solvent 8 and a stream of asphaltic residue 7 in a separation section 11.

In addition, FIG. 2 shows an embodiment in which there is recirculation of the stream of recovered solvent 8 to the extraction section 9, the stream of recovered solvent being mixed with the solvent stream 3.

The coprocessing of the present invention preferably involves the use of a lignocellulosic liquid stream consisting of bio-oil and an intermediate fossil stream consisting of vacuum residue.

The preferred sources of natural raw materials for obtaining the lignocellulosic liquid stream include cellulose and hemicellulose obtained from leaves and bagasse, and sugars, such as sugar cane. In particular, the lignocellulosic liquid stream may come from the pulp and paper industry from the Kraft route.

In one embodiment of the invention, the hydrocarbon solvent employed in the coprocessing consists of $C_3$-$C_7$ hydrocarbons, preferably resulting from oil refining processes. More preferably, the hydrocarbon solvent is selected from liquefied petroleum gas (LPG) and pentane.

The contacting of the solvent stream 3, in conditions without solvent recycling, or the contacting of the mixture of the solvent streams 3 and 8 with the combined feed consisting of streams 2 and 1 in the extraction section 9 takes place at a weight ratio between 0.5 and 10, preferably between 3 and 6.

The lignocellulosic liquid stream 2 corresponds to 0.1 to 99.9 wt % of the total feed added to the extraction section 9, preferably corresponding to 10 to 75 wt %.

In the context of the present invention, total feed added to the extraction section 9 means the feed consisting of the lignocellulosic liquid stream 2, intermediate fossil stream 1 and solvent stream 3, when there is no recycling of the stream of recovered solvent 8 to the extraction section 9 (FIG. 1).

When the recovered solvent 8 is recycled to the extraction section 9 (FIG. 2), total feed added to the extraction section 9 means the feed consisting of the lignocellulosic liquid stream 2, intermediate fossil stream 1 and the mixture of solvent streams 3 and 8.

The step of contacting the solvent stream 3 or the mixture of solvent streams 3 and 8 with the combined feed of streams 2 and 1 in the extraction section 9 takes place in the temperature range between 60° C. and 120° C. and in the pressure range between 100 and 10 000 kPa.

The present invention also relates to a process for producing fuels from the deasphalted oil stream 6 obtained in the claimed coprocessing.

Figure 3:
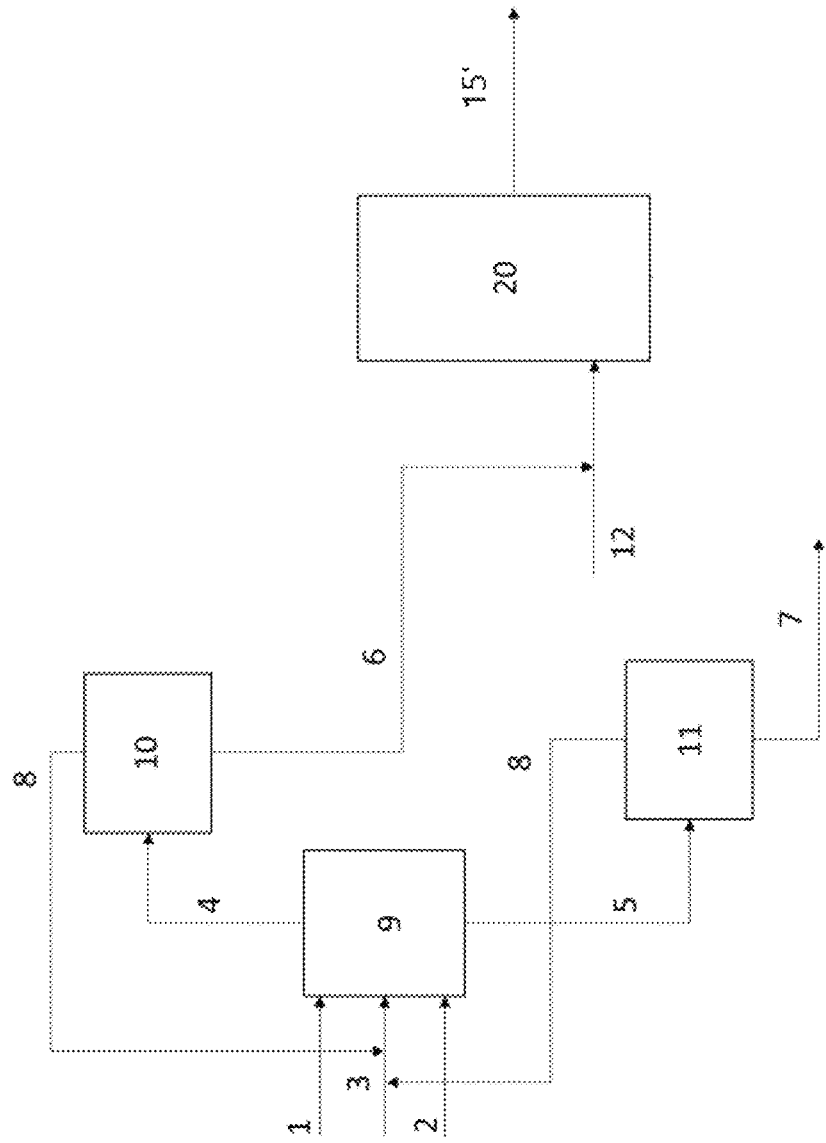
FIG. 3 shows a general flowchart of the process for producing fuels from a deasphalted oil stream comprising carbon of renewable origin in a conversion section.

The process, shown in FIG. 3, comprises sending the deasphalted oil stream 6 comprising carbon of renewable origin to an oil refinery conversion section 20. In section 20, the stream 6 is converted into the fuel stream 15'.

The conversion section 20 is selected from catalytic hydrocracking unit, HDT, thermal cracking, fluidized-bed catalytic cracking, visbreaking, delayed coking and catalytic reforming.

In one embodiment of the present invention, the deasphalted oil stream 6 is mixed with an intermediate fossil stream 12 before being sent to the conversion section in a proportion in the range from 30 to 70 wt %, based on the weight of the total feed fed into the conversion section 20.

In addition, the stream 6 may be mixed with the fossil stream 12 inside the conversion section 20, maintaining the proportion of the mixture in the range from 30 to 70 wt %, based on the weight of the total feed fed into the conversion section 20.

In a preferred embodiment, the conversion unit is a unit for fluidized-bed catalytic cracking (FCC).

Figure 4:
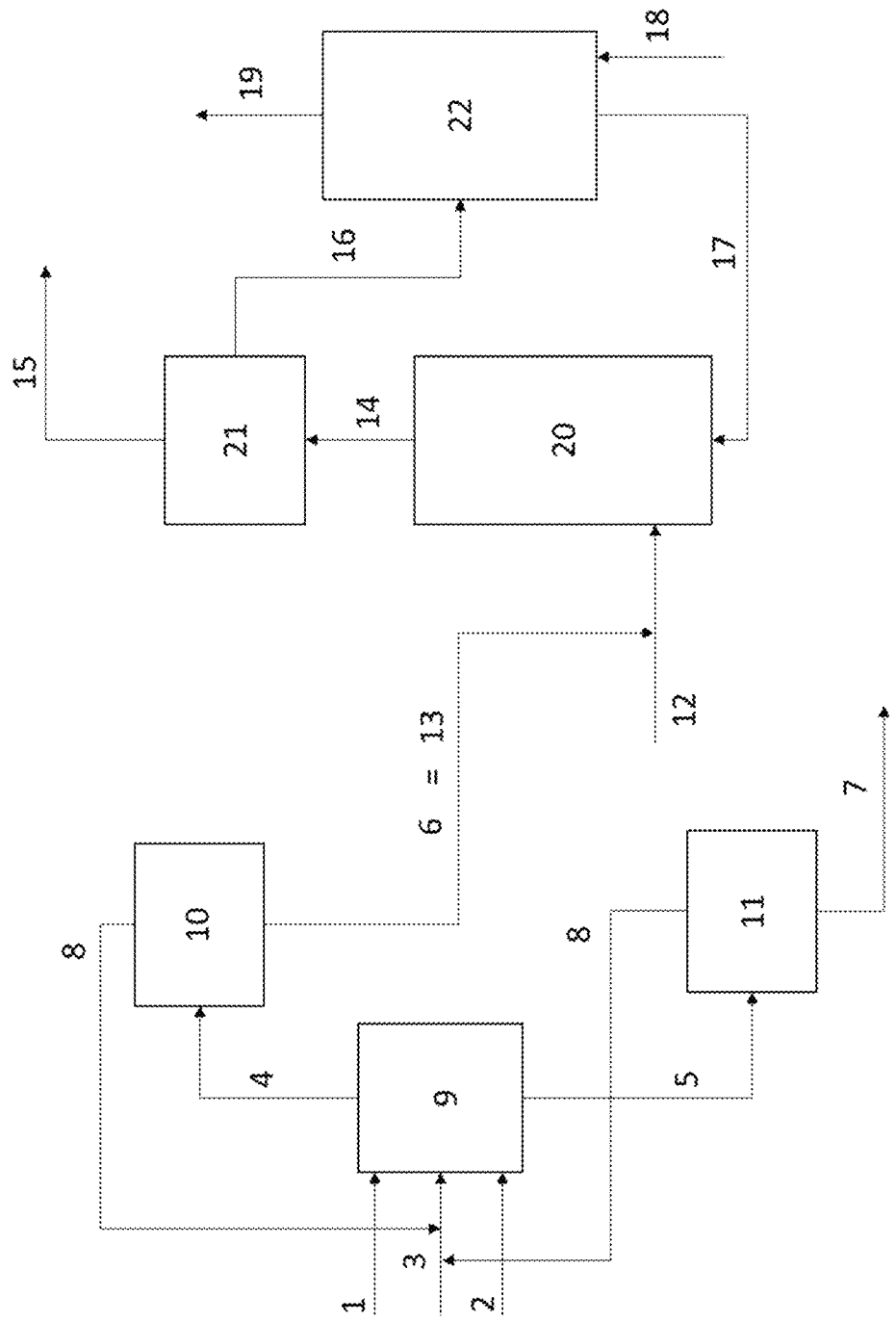
FIG. 4 shows a schematic flowchart of the process for producing fuels from a deasphalted oil stream comprising carbon of renewable origin in an FCC unit.

The FCC unit, as demonstrated in FIG. 4, comprises a reaction section 20', a rectification section 21 and a catalyst regeneration section 22.

The reaction section 20' may operate in a temperature range between 400 and 700° C., preferably between 420° C. and 620° C., and has a residence time that varies between 1 and 10 seconds. There is also injection of steam between 5 and 50 wt %, based on the total feed fed into the reaction section.

FIG. 4 also shows that the product from the reaction section 20' is a stream comprising a cracked effluent and a spent catalyst 14. The product is sent to the rectification section 21 for separating the cracked effluent 15 from the clean spent catalyst 16 and separation may be effected by cyclones in a preferred embodiment. The cracked effluent 15 may be gasoline, diesel or fuel oil.

The clean spent catalyst 16 is then sent to the catalyst regeneration section 22, and combustion gases 19 are generated after combustion of the catalyst with an air stream 18.

The regenerated catalyst 17 that leaves the catalyst regeneration 22 returns to the reaction section 20'.

The description given hereunder will be based on preferred embodiments of the invention. As will be obvious to a person skilled in the art, the invention is not limited to these particular embodiments.

EXAMPLES

Example 1—Process for Deasphalting Vacuum Residue with Pentane as Solvent

Vacuum residue, the characterization of which can be seen in Table 1, was deasphalted with pentane. The extraction temperature was maintained at 65° C. and the system was pressurized so that the solvent was in the liquid phase.

TABLE 1

Characterization of the vacuum residue.

| Analysis | RV |
|---|---|
| Residue of Carbon by thermogravimetric analysis (RC-TG) (% w/w) | 7.9% |
| Elemental analysis (% w/w) | |
| % N | 1.0% |
| % C | 86.7% |
| % H | 11.4% |
| % S | 1.1% |
| Index of Acidity (IAT) (mg KOH/g) | 0.00 |
| 13C NMR carbonyl and carboxyl | <0.5% |
| 13C NMR aromatics and olefinics | 21.3% |
| 13C NMR cyclooxygenated compounds | <0.5% |
| 13C NMR ethers, esters and hydroxy | <0.5% |
| 13C NMR alkyls | 78.7% |

The system was stirred for 6 hours, and was then submitted to separation of the two phases by decanting for 15 hours. The two fractions obtained were discharged from the system in the same condition of equilibrium proposed during the steps of extraction and decanting (phase separation). The results are presented in Table 2.

TABLE 2

Result of the deasphalting process of the vacuum residue using pentane as solvent.

| Results | 100% RV |
|---|---|
| DEAO (deasphalted oil) [%] | 87.8% |
| Elemental analysis (% w/w) | |
| % N | 0.8% |
| % C | 86.2% |
| % H | 11.9% |
| % S | 0.3% |
| RC TG [%] | 5.2% |
| IAT (mg KOH/g) | 0.00 |
| 13C NMR carbonyl and carboxyl | <0.5% |
| 13C NMR aromatics and olefinics | 19.6% |
| 13C NMR cyclooxygenated compounds | <0.5% |
| 13C NMR ethers, esters and hydroxy | <0.5% |
| 13C NMR alkyls | 80.4% |

Example 2—Coprocessing of Vacuum Residue and a Lignocellulosic Liquid Stream A (BIO A) in a Deasphalting Process with Pentane as Solvent The vacuum residue characterized in Table 1 was coprocessed with 10%, 25%, 33%, 63% and 75% by weight of the stream resulting from the conversion of lignocellulosic biomass A (BIO A) using pentane as solvent in the deasphalting process. The characterization of the stream BIO A is shown in Table 3. The weight ratio of pentane to the combined feed was equal to five.

The extraction temperature was maintained at 65° C. and the system was pressurized to 1379 kPa using molecular nitrogen. The system was stirred mechanically at 200 rpm for 6 hours, and was then submitted to separation of the two phases by decanting for 10 hours.

The two fractions obtained were discharged from the system in the same condition of equilibrium proposed during the steps of extraction and decanting. The results are presented in Table 4.

TABLE 3

Characterization of the stream BIO A.

| Analysis | BIO A |
|---|---|
| RC TG [%] | 16.1% |
| Elemental analysis (% w/w) | |
| % N | 0.3% |
| % C | 42.6% |
| % H | 7.3% |
| % S | 0.3% |
| % O | 49.5% |
| IAT (mg KOH/g) | 96.1 |
| 13C NMR carbonyl and carboxyl | 6.6% |
| 13C NMR aromatics and olefinics | 34.6% |
| 13C NMR cyclooxygenated compounds | 16.0% |
| 13C NMR ethers, esters and hydroxy | 19.5% |
| 13C NMR alkyls | 23.3% |

TABLE 4

Result of the deasphalting process of the vacuum residue coprocessed with the stream BIO A using pentane as solvent.

| | Percentage of BIO A coprocessed | | | | |
|---|---|---|---|---|---|
| | 10% | 25% | 33% | 63% | 75% |
| DEAO [%] | 83.8% | 78.2% | 71.1% | 52.8% | 43.3% |
| Elemental analysis (% w/w) | | | | | |
| % N | 1.0% | 0.5% | 0.7% | 0.5% | 0.5% |
| % C | 85.8% | 85.8% | 85.4% | 85.4% | 84.2% |
| % H | 11.6% | 11.7% | 11.7% | 11.5% | 11.3% |
| % S | 0.6% | 0.5% | 0.5% | 0.6% | 0.5% |
| % O | 1.0% | 1.5% | 1.6% | 2.0% | 3.5% |
| RC TG [%] | 4.1% | 3.9% | 3.8% | 3.5% | 3.1% |
| IAT (mg KOH/g) | 2.79 | 3.51 | 4.92 | 10.77 | 11.80 |
| 13C NMR carbonyl and carboxyl | 0.0% | 0.5% | 0.50% | 0.80% | 1.30% |
| 13C NMR aromatic and olefinics | 21.0% | 17.7% | 21.4% | 20.3% | 20.9% |
| 13C NMR cyclooxygenated compounds | <0.5% | <0.5% | <0.5% | <0.5% | <0.5% |
| 13C NMR ethers, esters and hydroxy | 0.0% | 1.1% | 1.2% | 1.9% | 2.1% |
| 13C NMR alkyls | 79.0% | 80.3% | 78.6% | 79.7% | 77.0% |

Example 3—Coprocessing of Vacuum Residue and a Lignocellulosic Liquid Stream B (BIO B) in a Deasphalting Process with Pentane as Solvent The vacuum residue characterized in Table I was coprocessed with 10%, 25%, 33%, 63% and 75% by weight of the stream resulting from the conversion of lignocellulosic biomass B (BIO B) using pentane as solvent in the deasphalting process. The characterization of the stream BIO B is shown in Table 5. The weight ratio of pentane to the combined feed was equal to five.

The extraction temperature was maintained at 65° C. and the system was pressurized to 1379 kPa using molecular nitrogen. The system was stirred mechanically at 200 rpm for 6 hours, and was then submitted to separation of the two phases by decanting for 10 hours.

The two fractions obtained were discharged from the system in the same condition of equilibrium proposed during the steps of extraction and decanting. The results are presented in Table 6.

TABLE 5

Characterization of the stream BIO B.

| Analysis | BIO B |
|---|---|
| RC TG [%] | 21.3% |
| Elemental analysis (% w/w) | |
| % N | 0.3% |
| % C | 66.5% |
| % H | 6.8% |
| % S | 0.3% |
| % O | 26.1% |
| IAT (mg KOH/g) | 142.1 |
| 13C NMR carbonyl and carboxyl | 5.0% |
| 13C NMR aromatics and olefinics | 66.5% |
| 13C NMR cyclooxygenated compounds | 0.5% |
| 13C NMR ethers, esters and hydroxy | 1.5% |
| 13C NMR alkyls | 27.0% |

TABLE 6

Result of the deasphalting process of the vacuum residue coprocessed with the stream BIO B using pentane as solvent.

| | Percentage of BIO B coprocessed | | | | |
|---|---|---|---|---|---|
| | 10% | 25% | 33% | 50% | 75% |
| DEAO [%] | 82.7% | 72.3% | 70.3% | 57.5% | 44.0% |
| Elemental analysis (% w/w) | | | | | |
| % N | 0.8% | 0.7% | 0.6% | 0.5% | 0.3% |
| % C | 85.7% | 84.6% | 84.3% | 82.5% | 79.9% |
| % H | 11.9% | 11.6% | 11.6% | 10.9% | 10.2% |
| % S | 0.4% | 0.3% | 0.3% | 0.3% | 0.3% |
| % O | 1.2% | 2.8% | 3.3% | 5.7% | 9.1% |
| RC TG CB [%] | 4.2% | 3.3% | 3.1% | 2.8% | 2.5% |
| IAT (mg KOH/g) | 0.67 | 1.53 | 3.11 | 5.52 | 8.30 |
| 13C NMR carbonyl and carboxyl | 0.5% | 0.5% | 0.7% | 0.5% | 1.5% |
| 13C NMR aromatic and olefinics | 18.5% | 21.2% | 21.6% | 26.1% | 31.6% |
| 13C NMR cyclooxygenated compounds | 0.5% | 0.5% | 0.5% | 0.5% | 0.5% |
| 13C NMR ethers, esters and hydroxy | 0.5% | 1.6% | 1.6% | 2.1% | 2.3% |
| 13C NMR alkyls | 80.0% | 76.2% | 75.7% | 71.8% | 64.1% |

Example 4—Comparison Between the Coprocessing of Vacuum Residue and a Lignocellulosic Liquid Stream (BIO A×BIO B) in a Deasphalting Process with LPG as Solvent The vacuum residue characterized in Table 1 was coprocessed with 33 wt % of the stream resulting from the conversion of lignocellulosic biomass A and B (Tables 3 and 5) using LPG as solvent in the deasphalting process. The weight ratio of LPG to the combined feed was equal to five.

The extraction temperature was maintained at 65° C. and the system was pressurized so that the solvent was in the liquid phase. The system was stirred for 6 hours, and was then submitted to separation of the two phases by decanting for 15 hours.

The two fractions obtained were discharged from the system in the same condition of equilibrium proposed during the steps of extraction and decanting. The results are presented in Table 7.

TABLE 7

Result of the deasphalting process of the vacuum residue coprocessed with stream BIO A or BIO B using LPG as solvent.

| Results | 33% BIO A | 33% BIO B |
|---|---|---|
| DEAO [%] | 51.7% | 56.6% |
| Elemental analysis (% w/w) | | |
| % N | 0.4% | 0.4% |
| % C | 85.2% | 85.1% |
| % H | 12.1% | 11.6% |
| % S | 0.3% | 0.4% |
| % O | 2.0% | 2.5% |
| RC TG [%] | 1.0% | 1.1% |
| IAT (mg KOH/g) | 3.94 | 6.49 |
| 13C NMR carbonyl and carboxyl | 1.1% | 1.5% |
| 13C NMR aromatic and olefinics | 16.2% | 23.3% |
| 13C NMR cyclooxygenated compounds | 0.5% | 0.5% |
| 13C NMR ethers, esters and hydroxy | 3.3% | 3.8% |
| 13C NMR alkyls | 19.2% | 71.4% |

Example 5—Comparison Between the Coprocessing of Vacuum Residue and a Lignocellulosic Liquid Stream (BIO A×BIO B) in a Deasphalting Process with Pentane as Solvent The vacuum residue characterized in Table 1 was coprocessed with 33%, 50% and 63% by weight of the stream resulting from the conversion of lignocellulosic biomass A and B (Tables 3 and 5) using pentane as solvent in the deasphalting process. The weight ratio of pentane to the combined feed was equal to five.

The extraction temperature was maintained at 65° C. and the system was pressurized so that the solvent was in the liquid phase. The system was stirred for 6 hours, and was then submitted to separation of the two phases by decanting for 15 hours.

The two fractions obtained were discharged from the system in the same condition of equilibrium proposed during the steps of extraction and decanting.

The samples of extract were analyzed for carbon 14 for determining the contents of renewable carbon. The results are presented in Table 8.

TABLE 8

Analysis of the content of renewable carbon in the feed obtained in the deasphalting process of the vacuum residue coprocessed with stream BIO A or BIO B using pentane as solvent.

| Results | 50% | 63% | 33% | 33% |
|---|---|---|---|---|
| Renewable feed | Bio B | Bio A | Bio B | Bio A |
| Total feed | 100 | 100 | 100 | 100 |
| Concentration of renewable feed [%] | 50 | 63 | 33 | 33 |

TABLE 8-continued

Analysis of the content of renewable carbon in the feed obtained in the deasphalting process of the vacuum residue coprocessed with stream BIO A or BIO B using pentane as solvent.

| Results | 50% | 63% | 33% | 33% |
|---|---|---|---|---|
| % C renewable feed | 66.5% | 42.6% | 66.5% | 42.6% |
| Yield DEAO [%] | 57.0 | 52.8 | 70.0 | 64.7 |
| % C renewable DEAO ($^{14}$C) | 5.38% | 5.88% | 1.74% | 1.15% |

Example 6—Process for Producing Liquid Fuels in an FCC Unit

Two series of tests were carried out with a stream of bio-oil, according to the following process stages for production of liquid motor fuels in the distillation range of gasoline and diesel:

A) deasphalting of the feed consisting of bio-oil, fed diluted in a liquid fossil hydrocarbon stream in contact with a solvent in the proportion from 0 wt % to 63 wt %, based on the weight of the combined feed of the fossil stream and the stream of bio-oil;

B) separation of the solvent and oil to obtain a liquid stream of deasphalted oil and recycling of the solvent, back to the deasphalting process and C) catalytic cracking of the liquid fraction fed into the FCC reactor in a catalyst bed containing zeolite catalyst for maximizing liquid motor fuels in the distillation range of gasoline and diesel.

Table 9 describes the yields of deasphalting carried out at a temperature of 65° C., 1379 kPa and stirred for 6 hours, using pentane as solvent. The coprocessing was carried out with Lula vacuum residue in all the experiments.

TABLE 9

Yields of deasphalting using pentane as solvent.

|  | DASF0 Fossil | DASF1 Bio-oil | DASF2 Bio-oil | DASF3 Bio-oil | DASF4 CPO | DASF5 CPO | DASF6 CPO |
|---|---|---|---|---|---|---|---|
| % Renewable fed | 0 | 25 | 33 | 63 | 25 | 33 | 50 |
| Solvent | Pentane | Pentane | Pentane | Pentane | Pentane | Pentane | Pentane |
| % DEAO | 88 | 72 | 65 | 52 | 74 | 70 | 57 |
| % RASF | 12 | 28 | 35 | 48 | 26 | 30 | 43 |

Table 10 shows characterization of the deasphalted oils thus produced, while Table 11 shows characterization of the heavy vacuum gas oil (HGO) Lula used in coprocessing with DEAO in catalytic cracking.

TABLE 10

Characterization of the deasphalted oils produced.

|  | Bio-oil Bio-oil | DEAO0 Fossil | DEAO1 Bio-oil | DEAO2 Bio-oil | DEAO3 Bio-oil | DEAO4 CPO | DEAO5 CPO | DEAO6 CPO |
|---|---|---|---|---|---|---|---|---|
| % Renewable fed | 100 | 0 | 25 | 33 | 63 | 25 | 33 | 50 |
| RC TG,% | — | 5.2 | 4.1 | 3.8 | 3.6 | 3.3 | — | 2.8 |
| Naphtha TG,% | — | 0.1 | 2.0 | 1.5 | 5.0 | 8.5 | — | 11.9 |
| % N | — | 0.8 | 0.5 | 0.7 | 0.5 | 0.7 | 0.6 | 0.6 |
| % C | — | 86.2 | 85.8 | 85.4 | 85.4 | 84.6 | 85.3 | 82.5 |
| % H | — | 11.9 | 11.7 | 11.7 | 11.5 | 11.6 | 11.6 | 10.9 |
| % S | — | 0.3 | 0.5 | 0.7 | 0.6 | 0.3 | 0.5 | 0.3 |
| % O | — | 0.8 | 1.5 | 1.5 | 2.0 | 2.8 | 2.0 | 5.7 |
| IAT | — | 0.0 | 3.51 | 4.92 | 10.27 | 1.53 | 3.11 | 5.52 |
| NMR carbonyl + carboxyl | — | 0.5 | 0.5 | 0.0 | — | 0.5 | 0.5 | 0.5 |
| NMR aromatics + olefinics | — | 19.6 | 17.7 | 21.4 | — | 21.2 | 21.6 | 26.1 |
| NMR cyclooxygenated compounds | — | 0.5 | 0.5 | 0.0 | — | 0.5 | 0.5 | 0.5 |
| NMR ethers + esters + hydroxy | — | 0.5 | 2.0 | 0.0 | — | 2.3 | 1.6 | 1.6 |
| NMR alkyls | — | 80.4 | 80.3 | 78.6 | — | 76.5 | 76.3 | 71.8 |
| Na, mg/kg | 5.4 | 16 | <0.5 | <0.5 | 10.7 | — | <0.5 | — |
| K, mg/kg | — | 2.2 | <1.0 | <1.0 | <1.0 | — | <1.0 | — |
| Ca, mg/kg | 16 | 9.7 | 6.7 | <0.5 | 5.0 | — | <0.5 | — |
| Fe, mg/kg | 4.6 | 2.7 | <0.5 | <0.5 | <0.5 | 2.0 | <0.5 | — |
| Mn, mg/kg | 2.0 | <0.5 | <0.5 | <0.5 | <0.5 | <0.5 | <0.5 | <0.5 |

TABLE 11

Characterization of the heavy vacuum gas oil (HGO) Lula used in coprocessing with DEAO in catalytic cracking.

| | | |
|---|---|---|
| Density (d20/4) | 0.9193 | |
| ° API | 21.8 | |
| RCR (wt %) | 0.2 | ASTM D524 |
| Total Nitrogen (wt %) | 0.205 | ASTM D5762 |
| Basic Nitrogen (mg/kg) | 1131 | UOP 269 |
| Sulfur (wt %) | 0.337 | ASTM D5453 |
| Viscosity at 60° C. (mm$^2$/s) | 52.7 | ASTM D445-1 |
| Viscosity at 82.2° C. (mm$^2$/s) | 21.2 | ASTM D445-2 |
| Viscosity at 100° C. (mm$^2$/s) | 12.11 | ASTM D445-3 |
| Aniline Point (° C.) | 90.35 | ASTM D611 |
| Metals | | |
| Na (mg/kg) | <0.5 | N2440 |
| Ca (mg/kg) | 1.3 | N2440 |
| Ni (mg/kg) | <0.5 | N2440 |
| V (mg/kg) | <1 | N2440 |
| Fe (mg/kg) | 1.4 | N2440 |

TABLE 11-continued

Characterization of the heavy vacuum gas oil (HGO) Lula used in coprocessing with DEAO in catalytic cracking.

| Type of hydrocarbon - SFC | | |
|---|---|---|
| Saturates (wt %) | 60.3 | PE-4CE-00313 -= A |
| Monoaromatics (wt %) | 17.5 | PE-4CE-00313 -= A |
| Diaromatics (wt %) | 14.6 | PE-4CE-00313 -= A |
| Tri aromatics (wt %) | 5.3 | PE-4CE-00313 -= A |
| Polyaromatics (wt %) | 2.3 | PE-4CE-00313 -= A |
| C/H ratio - NMR | 0.5465 | HASAN, M.; FUEL, 62, 518-23 |
| % C unsaturated | 17 | HASAN, M.; FUEL, 62, 518-23 |
| % C saturated | 83 | HASAN, M.; FUEL, 62, 518-23 |
| % H aromatic | 3.4 | HASAN, M.; FUEL, 62, 518-23 |
| % H olefinic | 0.1 | HASAN, M.; FUEL, 62, 518-23 |
| % H saturated | 96.5 | HASAN, M.; FUEL, 62, 518-23 |

The deasphalted oils (DEAO) shown in Table 10 were mixed with the heavy vacuum gas oil (HGO) from Table 11 in the proportion of 30% of DEAO to 70% of HGO, by weight, and were used as feed in a catalytic cracking unit at a reaction temperature of 535° C.

Table 12 presents data relating to the process for producing liquid fuels from a mixture of DEAO and HGO, in which DEAO 0 has 100% fossil origin.

TABLE 12

| Feed | 30% DEAO0 + 70% HGOLULA | 30% DEAO0 + 70% HGOLULA | 30% DEAO0 + 70% HGOLULA | 30% DEAO0 + 70% HGOLULA | 30% DEAO0 + 70% HGOLULA |
|---|---|---|---|---|---|
| Cracking Temperature, ° C. | 535 | 535 | 535 | 535 | 535 |
| Cat/oil ratio | 4.02 | 6.00 | 6.00 | 6.00 | 8.04 |
| Conversion, wt % | 69.50 | 77.87 | 74.55 | 78.47 | 78.95 |
| Yield, wt % | | | | | |
| Coke | 6.52 | 8.82 | 7.75 | 9.62 | 10.29 |
| Dry Gas | 3.22 | 3.85 | 3.34 | 3.87 | 3.78 |
| Hydrogen | 0.18 | 0.18 | 0.17 | 0.18 | 0.15 |
| H$_2$S | 0.00 | 0.00 | 0.00 | 0.00 | 0.00 |
| Methane | 1.23 | 1.51 | 1.29 | 1.53 | 1.48 |
| Ethane | 0.97 | 1.06 | 0.96 | 1.07 | 1.03 |
| Ethylene | 0.84 | 1.10 | 0.92 | 1.08 | 1.12 |
| CO | 0.07 | 0.00 | 0.00 | 0.00 | 0.07 |
| CO$_2$ | 0.12 | 0.20 | 0.18 | 0.18 | 0.29 |
| LPG | 14.39 | 18.88 | 16.49 | 18.74 | 18.98 |
| Propane | 1.28 | 1.96 | 1.51 | 2.00 | 1.98 |
| Propylene | 3.75 | 4.74 | 4.26 | 4.64 | 4.73 |
| n-Butane | 1.07 | 1.63 | 1.28 | 1.64 | 1.65 |
| Isobutane | 3.05 | 5.05 | 3.92 | 5.03 | 5.19 |
| C4 Olefins | 5.23 | 5.50 | 5.52 | 5.43 | 5.44 |
| 1-Butylene | 1.18 | 1.30 | 1.27 | 1.27 | 1.27 |
| Isobutylene | 1.61 | 1.47 | 1.59 | 1.45 | 1.46 |
| c-2-Butylene | 1.14 | 1.28 | 1.24 | 1.26 | 1.27 |
| t-2-Butylene | 1.26 | 1.43 | 1.38 | 1.41 | 1.41 |
| Butadiene | 0.04 | 0.03 | 0.04 | 0.03 | 0.04 |
| Gasoline | 45.2 | 46.1 | 46.8 | 46.1 | 45.5 |
| LCO | 16.0 | 13.0 | 14.3 | 12.6 | 12.4 |
| Base | 14.5 | 9.1 | 11.2 | 8.9 | 8.6 |

Table 13 presents a summary of the results obtained by varying the catalyst/oil ratio obtained for a mixture of deasphalted oil and the heavy gas oil in Table 11 in the ratio of 30%/70% for the deasphalted oil (DEAO) and gas oil (HGO), respectively, the DEAO being obtained from 25% of bio-oil fed into the deasphalting process (DEAO1).

TABLE 13

| Feed | 30% DEAO1 + 70% HGOLULA | 30% DEAO1 + 70% HGOLULA | 30% DEAO1 + 70% HGOLULA | 30% DEAO1 + 70% HGOLULA | 30% DEAO1 + 70% HGOLULA |
|---|---|---|---|---|---|
| Cracking temperature, ° C. | 535 | 535 | 535 | 535 | 535 |

TABLE 13-continued

| Feed | 30% DEAO1 + 70% HGOLULA | 30% DEAO1 + 70% HGOLULA | 30% DEAO1 + 70% HGOLULA | 30% DEAO1 + 70% HGOLULA | 30% DEAO1 + 70% HGOLULA |
|---|---|---|---|---|---|
| Catalyst/oil, w/w | 4.02 | 6.00 | 6.00 | 6.00 | 8.04 |
| Conversion, wt % | 72.50 | 76.54 | 76.89 | 77.09 | 79.31 |
| Yield, wt % | | | | | |
| Coke | 7.19 | 8.91 | 9.30 | 9.21 | 10.90 |
| Dry Gas | 3.45 | 3.68 | 3.80 | 3.73 | 4.02 |
| Hydrogen | 0.18 | 0.20 | 0.19 | 0.19 | 0.22 |
| $H_2S$ | 0.00 | 0.00 | 0.00 | 0.00 | 0.00 |
| Methane | 1.36 | 1.46 | 1.51 | 1.48 | 1.62 |
| Ethane | 1.02 | 1.00 | 1.06 | 1.05 | 1.10 |
| Ethylene | 0.89 | 1.02 | 1.04 | 1.02 | 1.08 |
| CO | 0.07 | 0.07 | 0.08 | 0.08 | 0.09 |
| $CO_2$ | 0.13 | 0.18 | 0.19 | 0.19 | 0.23 |
| LPG | 15.48 | 17.83 | 17.70 | 17.66 | 18.09 |
| Propane | 1.47 | 1.81 | 1.91 | 1.85 | 1.97 |
| Propylene | 3.96 | 4.49 | 4.38 | 4.41 | 4.51 |
| n-Butane | 1.21 | 1.53 | 1.58 | 1.55 | 1.60 |
| Isobutane | 3.46 | 4.72 | 4.76 | 4.69 | 4.83 |
| C4 Olefins | 5.38 | 5.27 | 5.06 | 5.16 | 5.18 |
| 1-Butylene | 1.22 | 1.26 | 1.19 | 1.21 | 1.23 |
| Isobutylene | 1.60 | 1.40 | 1.33 | 1.37 | 1.39 |
| c-2-Butylene | 1.20 | 1.22 | 1.19 | 1.21 | 1.20 |
| t-2-Butylene | 1.33 | 1.37 | 1.33 | 1.35 | 1.35 |
| Butadiene | 0.03 | 0.01 | 0.03 | 0.02 | 0.03 |
| Gasoline | 46.2 | 45.9 | 45.8 | 46.2 | 46.0 |
| LCO | 15.0 | 13.6 | 13.6 | 13.6 | 12.4 |
| Base | 12.5 | 9.8 | 9.5 | 9.3 | 8.3 |

Table 14 presents a summary of the results obtained by varying the catalyst/oil ratio for a mixture of deasphalted oil and the heavy gas oil in Table 11 in the ratio of 30%/70% for the deasphalted oil (DEAO) and gas oil (HGO), respectively, the DEAO being obtained from 33% of bio-oil fed into the deasphalting process (DEAO2).

Table 15 presents a summary of the results obtained by varying the catalyst/oil ratio for a mixture of deasphalted oil and the heavy gas oil in Table 11 in the ratio of 30%/70% for the deasphalted oil (DEAO) and gas oil (HGO), respectively, the DEAO being obtained from 63% of bio-oil fed into the deasphalting process (DEAO3).

TABLE 14

| Feed | 30% DEAO2 + 70% HGOLULA | 30% DEAO2 + 70% HGOLULA | 30% DEAO2 + 70% HGOLULA | 30% DEAO2 + 70% HGOLULA | 30% DEAO2 + 70% HGOLULA |
|---|---|---|---|---|---|
| Cracking Temperature, ° C. | 535 | 535 | 535 | 535 | 535 |
| Catalyst/oil, w/w | 4.02 | 6.00 | 6.00 | 6.00 | 8.04 |
| Conversion, wt % | 73.02 | 77.24 | 76.84 | 77.21 | 79.94 |
| Yield, wt % | | | | | |
| Coke | 7.68 | 9.24 | 8.95 | 9.17 | 11.60 |
| Dry Gas | 3.92 | 3.76 | 3.72 | 3.80 | 4.17 |
| Hydrogen | 0.21 | 0.20 | 0.19 | 0.19 | 0.18 |
| $H_2S$ | 0.00 | 0.00 | 0.00 | 0.00 | 0.00 |
| Methane | 1.58 | 1.49 | 1.48 | 1.51 | 1.68 |
| Ethane | 1.17 | 1.03 | 1.05 | 1.07 | 1.17 |
| Ethylene | 0.96 | 1.04 | 1.01 | 1.04 | 1.15 |
| CO | 0.08 | 0.08 | 0.08 | 0.08 | 0.09 |
| $CO_2$ | 0.17 | 0.19 | 0.19 | 0.19 | 0.34 |
| LPG | 15.67 | 18.10 | 17.51 | 17.74 | 18.85 |
| Propane | 1.75 | 1.94 | 1.89 | 1.95 | 2.35 |
| Propylene | 3.98 | 4.48 | 4.32 | 4.36 | 4.44 |
| n-Butane | 1.39 | 1.62 | 1.57 | 1.62 | 1.87 |
| Isobutane | 3.86 | 4.92 | 4.65 | 4.77 | 5.46 |
| C4 Olefins | 4.69 | 5.13 | 5.07 | 5.04 | 4.73 |
| 1-Butylene | 1.11 | 1.22 | 1.20 | 1.19 | 1.10 |
| Isobutylene | 1.35 | 1.34 | 1.35 | 1.31 | 1.19 |
| c-2-Butylene | 1.02 | 1.21 | 1.18 | 1.19 | 1.14 |
| t-2-Butylene | 1.16 | 1.35 | 1.32 | 1.32 | 1.27 |
| Butadiene | 0.04 | 0.02 | 0.03 | 0.02 | 0.03 |
| Gasoline | 45.5 | 45.9 | 46.4 | 46.2 | 44.9 |
| LCO | 15.3 | 13.4 | 13.5 | 13.5 | 12.3 |
| Base | 11.7 | 9.3 | 9.6 | 9.3 | 7.7 |

TABLE 15

| Feed name | 30% DEAO3 + 70% HGOLULA | 30% DEAO3 + 70% HGOLULA | 30% DEAO3 + 70% HGOLULA | 30% DEAO3 + 70% HGOLULA |
|---|---|---|---|---|
| Cracking Temp., ° C. | 535 | 535 | 535 | 535 |
| Cat/oil, w/w | 6.00 | 6.00 | 6.00 | 8.04 |
| Conversion, wt % | 78.17 | 76.59 | 77.35 | 82.72 |
| Yield, wt % | | | | |
| Coke | 8.73 | 8.47 | 8.86 | 14.18 |
| Dry Gas | 3.90 | 3.68 | 3.76 | 4.81 |
| Hydrogen | 0.15 | 0.14 | 0.14 | 0.16 |
| $H_2S$ | 0.00 | 0.00 | 0.00 | 0.00 |
| Methane | 1.54 | 1.45 | 1.49 | 1.96 |
| Ethane | 1.06 | 1.03 | 1.06 | 1.30 |
| Ethylene | 1.14 | 1.06 | 1.08 | 1.40 |
| CO | 0.14 | 0.15 | 0.14 | 0.15 |
| $CO_2$ | 0.21 | 0.25 | 0.24 | 0.39 |
| LPG | 18.98 | 17.85 | 18.01 | 20.96 |
| Propane | 2.01 | 1.90 | 2.00 | 3.12 |
| Propylene | 4.81 | 4.49 | 4.46 | 4.49 |
| n-Butane | 1.65 | 1.56 | 1.62 | 2.32 |
| Isobutane | 5.09 | 4.71 | 4.88 | 6.88 |
| C4 Olefins | 5.41 | 5.19 | 5.05 | 4.15 |
| 1-Butylene | 1.30 | 1.23 | 1.20 | 0.99 |
| Isobutylene | 1.42 | 1.38 | 1.31 | 1.01 |
| c-2-Butylene | 1.26 | 1.21 | 1.19 | 1.01 |
| t-2-Butylene | 1.42 | 1.35 | 1.33 | 1.13 |
| Butadiene | 0.02 | 0.03 | 0.02 | 0.02 |
| Gasoline | 46.2 | 46.2 | 46.3 | 42.2 |
| LCO | 12.8 | 13.7 | 13.4 | 11.0 |
| Base | 9.0 | 9.7 | 9.2 | 6.3 |
| Total | 100.00 | 100.00 | 100.00 | 100.00 |

Table 16 presents a summary of the results obtained by varying the catalyst/oil ratio for a mixture of deasphalted oil and the heavy gas oil in Table 11 in the ratio of 30%/70% for the deasphalted oil (DEAO) and gas oil (HGO), respectively, the DEAO being obtained from 25% of catalytic bio-oil fed into the deasphalting process (DEAO4).

Table 17 presents a summary of the results obtained by varying the catalyst/oil ratio for a mixture of deasphalted oil and the heavy gas oil in Table 11 in the ratio of 30%/70% for the deasphalted oil (DEAO) and gas oil (HGO), respectively, the DEAO being obtained from 33% of catalytic bio-oil fed into the deasphalting process (DEAO5).

TABLE 16

| Feed | 30% DEAO4 + 70% HGOLULA | 30% DEAO4 + 70% HGOLULA | 30% DEAO4 + 70% HGOLULA | 30% DEAO4 + 70% HGOLULA | 30% DEAO4 + 70% HGOLULA |
|---|---|---|---|---|---|
| Cracking temperature, ° C. | 535 | 535 | 535 | 535 | 535 |
| Cat/oil, w/w | 4.02 | 6.00 | 6.00 | 6.00 | 8.04 |
| conversion, wt % | 71.32 | 77.12 | 77.85 | 77.57 | 80.03 |
| Yield, wt % | | | | | |
| Coke | 6.66 | 8.55 | 8.76 | 9.00 | 11.53 |
| Dry Gas | 3.31 | 3.63 | 3.67 | 3.65 | 3.89 |
| Hydrogen | 0.13 | 0.15 | 0.14 | 0.13 | 0.13 |
| $H_2S$ | 0.00 | 0.00 | 0.00 | 0.00 | 0.00 |
| Methane | 1.31 | 1.42 | 1.44 | 1.43 | 1.53 |
| Ethane | 0.98 | 0.98 | 1.01 | 1.01 | 1.04 |
| Ethylene | 0.89 | 1.09 | 1.09 | 1.08 | 1.20 |
| CO | 0.00 | 0.07 | 0.07 | 0.07 | 0.09 |
| $CO_2$ | 0.16 | 0.20 | 0.24 | 0.23 | 0.37 |
| LPG | 15.49 | 18.36 | 18.48 | 18.38 | 19.42 |
| Propane | 1.67 | 1.90 | 1.93 | 1.96 | 2.22 |
| Propylene | 3.81 | 4.66 | 4.65 | 4.56 | 4.70 |
| n-Butane | 1.37 | 1.58 | 1.60 | 1.62 | 1.81 |
| Isobutane | 3.89 | 5.06 | 5.01 | 5.06 | 5.74 |
| C4 Olefins | 4.74 | 5.16 | 5.29 | 5.18 | 4.95 |
| 1-Butylene | 1.10 | 1.24 | 1.25 | 1.22 | 1.15 |
| Isobutylene | 1.32 | 1.35 | 1.38 | 1.35 | 1.26 |
| c-2-Butylene | 1.09 | 1.20 | 1.24 | 1.22 | 1.18 |
| t-2-Butylene | 1.22 | 1.35 | 1.39 | 1.37 | 1.33 |
| Butadiene | 0.02 | 0.02 | 0.02 | 0.02 | 0.02 |
| Gasoline | 45.7 | 46.3 | 46.6 | 46.2 | 44.7 |
| LCO | 16.1 | 13.4 | 12.9 | 13.2 | 11.9 |
| Base | 12.6 | 9.5 | 9.3 | 9.2 | 8.0 |

TABLE 17

| Feed | 30% DEAO5 + 70% HGO LULA | 30% DEAO5 + 70% HGO LULA | 30% DEAO5 + 70% HGO LULA | 30% DEAO5 + 70% HGO LULA |
|---|---|---|---|---|
| Cracking temperature, °C. | 535 | 535 | 535 | 535 |
| Cat/oil, w/w | 4.02 | 6.00 | 6.00 | 6.00 |
| Conversion, wt % | 68.76 | 75.10 | 75.60 | 73.45 |
| Yield, wt % | | | | |
| Coke | 6.41 | 9.24 | 9.16 | 8.12 |
| Dry Gas | 3.30 | 3.70 | 3.84 | 3.57 |
| Hydrogen | 0.17 | 0.19 | 0.19 | 0.17 |
| $H_2S$ | 0.00 | 0.00 | 0.00 | 0.00 |
| Methane | 1.27 | 1.47 | 1.53 | 1.40 |
| Ethane | 1.02 | 1.05 | 1.10 | 1.04 |
| Ethylene | 0.83 | 0.99 | 1.01 | 0.95 |
| CO | 0.08 | 0.08 | 0.08 | 0.08 |
| $CO_2$ | 0.19 | 0.26 | 0.23 | 0.26 |
| LPG | 13.94 | 17.00 | 17.08 | 16.48 |
| Propane | 1.39 | 1.96 | 1.98 | 1.76 |
| Propylene | 3.52 | 4.09 | 4.15 | 4.09 |
| n-Butane | 1.14 | 1.61 | 1.61 | 1.47 |
| Isobutane | 3.03 | 4.70 | 4.57 | 4.22 |
| C4 Olefins | 4.86 | 4.64 | 4.78 | 4.95 |
| 1-Butylene | 1.11 | 1.10 | 1.13 | 1.16 |
| Isobutylene | 1.46 | 1.18 | 1.25 | 1.33 |
| c-2-Butylene | 1.07 | 1.10 | 1.12 | 1.15 |
| t-2-Butylene | 1.18 | 1.24 | 1.25 | 1.28 |
| Butadiene | 0.04 | 0.02 | 0.02 | 0.03 |
| Gasoline | 44.8 | 44.8 | 45.2 | 44.9 |
| LCO | 16.6 | 14.9 | 14.5 | 15.4 |
| Base | 14.6 | 10.0 | 9.9 | 11.1 |

Table 18 presents a summary of the results obtained by varying the catalyst/oil ratio for a mixture of deasphalted oil and the heavy gas oil in Table 11 in the ratio of 30%/70% for the deasphalted oil (DEAO) and gas oil (HGO), respectively, the DEAO being obtained from 50% of catalytic bio-oil fed into the deasphalting process (DEAO6).

Table 19 below presents the yields by weight obtained for each of the deasphalted oils (DEAO 0, DEAO 1, DEAO 2, DEAO 3 and DEAO 4) compared at constant yield of coke, which gives better simulation of a catalytic cracking unit on a commercial scale.

TABLE 18

| Feed | 30% DEAO6 + 70% HGOLULA | 30% DEAO6 + 70% HGOLULA | 30% DEAO6 + 70% HGOLULA | 30% DEAO6 + 70% HGOLULA | 30% DEAO6 + 70% HGOLULA |
|---|---|---|---|---|---|
| Cracking temperature, °C. | 535 | 535 | 535 | 535 | 535 |
| Cat/oil, w/w | 4.02 | 6.00 | 6.00 | 6.00 | 8.04 |
| Conversion, wt % | 72.17 | 75.78 | 76.04 | 76.63 | 77.32 |
| Yield, wt % | | | | | |
| Coke | 6.22 | 8.35 | 8.39 | 8.68 | 9.80 |
| Dry Gas | 3.16 | 3.54 | 3.51 | 3.53 | 3.62 |
| Hydrogen | 0.10 | 0.12 | 0.11 | 0.11 | 0.10 |
| $H_2S$ | 0.00 | 0.00 | 0.00 | 0.00 | 0.00 |
| Methane | 1.23 | 1.37 | 1.37 | 1.37 | 1.41 |
| Ethane | 0.92 | 0.95 | 0.96 | 0.96 | 0.98 |
| Ethylene | 0.91 | 1.10 | 1.08 | 1.09 | 1.15 |
| CO | 0.10 | 0.11 | 0.11 | 0.12 | 0.12 |
| $CO_2$ | 0.18 | 0.27 | 0.29 | 0.27 | 0.37 |
| LPG | 15.53 | 18.22 | 17.82 | 17.98 | 18.26 |
| Propane | 1.53 | 1.86 | 1.85 | 1.87 | 2.09 |
| Propylene | 3.95 | 4.63 | 4.49 | 4.53 | 4.44 |
| n-Butane | 1.27 | 1.55 | 1.53 | 1.55 | 1.69 |
| Isobutane | 3.78 | 4.96 | 4.83 | 4.91 | 5.30 |
| C4 Olefins | 5.00 | 5.21 | 5.11 | 5.12 | 4.73 |
| 1-Butylene | 1.15 | 1.25 | 1.20 | 1.20 | 1.12 |
| Isobutylene | 1.41 | 1.36 | 1.33 | 1.33 | 1.21 |
| c-2-Butylene | 1.14 | 1.22 | 1.20 | 1.21 | 1.12 |
| t-2-Butylene | 1.26 | 1.37 | 1.35 | 1.35 | 1.26 |
| Butadiene | 0.03 | 0.01 | 0.03 | 0.02 | 0.02 |
| Gasoline | 47.0 | 45.3 | 45.9 | 46.1 | 45.2 |
| LCO | 15.7 | 13.4 | 13.6 | 13.4 | 13.5 |
| Base | 12.1 | 10.8 | 10.3 | 9.9 | 9.2 |

TABLE 19

Comparative data relating to the process for producing liquid fuels from deasphalted oils DEAO 0, DEAO 1, DEAO 2 and DEAO 3.

| | FCC Feed | | | | |
|---|---|---|---|---|---|
| | DEAO 0 Reference | DEAO 1 Bio-oil | DEAO 2 Bio-oil | DEAO 3 Bio-oil | DEAO 4 Bio-oil |
| Cracking temperature (° C.) | 535 | 535 | 535 | 535 | 535 |
| Conversion (wt %) | 76.1 | 75.5 | 75.5 | 77.0 | 73.97 |
| Conversion/(100-Conversion) | 3.2 | 3.1 | 3.1 | 3.4 | 2.84 |
| Catalyst/oil ratio (w/w) | 5.9 | 5.3 | 5.1 | 5.9 | 5.64 |
| Variation of coke (wt %) | 1.4 | 1.6 | 1.7 | 1.4 | 1.51 |
| Yields (wt %) | | | | | |
| Coke | 8.50 | 8.50 | 8.50 | 8.50 | 8.50 |
| Dry gas | 3.60 | 3.65 | 3.83 | 3.73 | 3.32 |
| Hydrogen | 0.17 | 0.19 | 0.20 | 0.14 | 0.16 |
| Hydrogen sulfide | 0.00 | 0.00 | 0.00 | 0.00 | |
| Methane | 1.40 | 1.45 | 1.53 | 1.47 | 1.30 |
| Ethane | 1.02 | 1.03 | 1.10 | 1.04 | 0.96 |
| Ethylene | 1.01 | 0.98 | 1.00 | 1.08 | 0.91 |
| CO | 0.00 | 0.08 | 0.08 | 0.14 | 0.04 |
| $CO_2$ | 0.19 | 0.16 | 0.15 | 0.24 | 0.22 |
| LPG | 17.46 | 16.83 | 17.00 | 18.08 | 15.48 |
| Propane | 1.72 | 1.71 | 1.85 | 1.93 | 1.51 |
| Propylene | 4.41 | 4.26 | 4.21 | 4.57 | 4.01 |
| n-Butane | 1.44 | 1.42 | 1.51 | 1.58 | 1.28 |
| Isobutane | 4.36 | 4.23 | 4.37 | 4.80 | 3.81 |
| $C_4$ Olefins | 5.53 | 5.20 | 5.05 | 5.20 | 4.86 |
| 1-Butylene | 1.28 | 1.22 | 1.20 | 1.23 | 1.16 |
| Isobutylene | 1.55 | 1.40 | 1.37 | 1.37 | 1.32 |
| cis-2-Butylene | 1.26 | 1.21 | 1.16 | 1.21 | 1.13 |
| trans-2-Butylene | 1.40 | 1.35 | 1.30 | 1.36 | 1.23 |
| Butadiene | 0.03 | 0.02 | 0.03 | 0.03 | 0.02 |
| Gasoline | 46.31 | 46.33 | 45.90 | 46.36 | 46.42 |
| LCO | 13.72 | 14.09 | 14.18 | 13.47 | 14.91 |
| Heavy compounds | 10.23 | 10.36 | 10.36 | 9.48 | 11.12 |
| Total | 100.00 | 100.00 | 100.00 | 100.00 | 100.00 |

As can be seen from Table 19, the yields of gasoline and LCO obtained using deasphalted oil comprising renewable carbon (DEAO 1, DEAO 2, DEAO 3 and DEAO 4) are very similar to those obtained with the reference of fossil origin (DEAO 0).

There are other positive points with respect to the use of the deasphalted oil stream comprising carbon of renewable origin.

It can be seen that there is not a pronounced increase in the yield of coke, which would affect the other yields in FCC.

Furthermore, production of water was not observed in the catalytic cracking process. The increases of carbon monoxide and dioxide were slight when compared to those normally obtained with pure bio-oil in this process, which reduces the occurrence of corrosion in the top system of the main fractionator.

As an additional advantage, the DEAO stream of partially renewable origin fed into the FCC process has a content of alkali metals and alkaline-earth metals lower than is contained in a conventional bio-oil. This avoids possible effects on the stability of the zeolite catalyst used in the process.

The description given up to here of the subject matter of the present invention must be considered only as one possible embodiment or possible embodiments, and any particular features introduced therein are only to be understood as something that was written to facilitate understanding. Accordingly, they cannot be considered in any way as limiting the invention, which is limited to the scope of the claims given hereunder.

Example 7—Coprocessing of Vacuum Residue and a Lignocellulosic Liquid Stream C (BIO C) in a Deasphalting Process with Pentane as Solvent The vacuum residue characterized in Table 1 was coprocessed with 25 wt % of the stream resulting from the conversion of lignocellulosic biomass C (BIO C) using pentane as solvent in the deasphalting process. The characterization of the stream BIO C is shown in Table 20. The weight ratio of pentane to the combined feed was equal to five.

The extraction temperature was maintained at 65° C. and the system was pressurized to 1379 kPa using molecular nitrogen. The system was stirred mechanically at 200 rpm for 6 hours, and was then submitted to separation of the two phases by decanting for 10 hours.

The two fractions obtained were discharged from the system in the same condition of equilibrium proposed during the steps of extraction and decanting. The results are presented in Table 21.

TABLE 20

Characterization of the stream BIO C.

| Analysis | BIO C |
|---|---|
| RC TG [%] | |
| Elemental analysis (% w/w) | |
| % N | 0.4% |
| % C | 69.9% |

TABLE 20-continued

Characterization of the stream BIO C.

| Analysis | BIO C |
|---|---|
| % H | 6.9% |
| % S | <0.3% |
| % O | 22.8% |
| IAT (mg KOH/g) | |
| 13C NMR carbonyl and carboxyl | 2.9% |
| 13C NMR aromatics and olefinics | 53.8% |
| 13C NMR cyclooxygenated compounds | <0.5% |
| 13C NMR ethers, esters and hydroxy | 5.3% |
| 13C NMR alkyls | 37.7% |

TABLE 21

Result of the deasphalting process of the vacuum residue coprocessed with the stream BIO C using pentane as solvent.

| Percentage of BIO C coprocessed | 25% |
|---|---|
| DEAO [%] | 74.7% |
| Elemental analysis (% w/w) | |
| % N | 0.8 |
| % C | 86.7 |
| % H | 11.8 |
| % S | <0.3 |
| % O | 1.5 |
| RC TG [%] | — |
| IAT (mg KOH/g) | — |
| 13C NMR carbonyl and carboxyl | <0.5% |
| 13C NMR aromatics and olefinics | 24.2% |
| 13C NMR cyclooxygenated compounds | <0.5% |
| 13C NMR ethers, esters and hydroxy | <0.5% |
| 13C NMR alkyls | 75.8% |

The invention claimed is:

1. A coprocessing of a lignocellulosic liquid stream and an intermediate fossil stream in the oil refining process, comprising:

contacting said intermediate fossil stream and said lignocellulosic liquid stream with a stream of solvent of C3-C10 hydrocarbons in an extraction section, obtaining a stream of extract with solvent and a stream of raffinate with solvent, in which the extraction section is a deasphalting unit; and sending said stream of extract with solvent to a separation section, obtaining a deasphalted oil stream comprising solvent-free carbon of renewable origin and a stream of recovered solvent; and sending the deasphalted oil stream to a conversion section of an oil refinery comprising a unit for fluidized-bed catalytic cracking, wherein said unit comprises a reaction section, a rectification section and a catalyst regeneration section, wherein said reaction section operates in a temperature range between 400 and 700° C., having a residence time that varies between 1 and 10 seconds and with steam injection between 5 and 50 wt %, based on the total feed fed into the reaction section;

wherein said contact between said stream of solvent of hydrocarbons and the combined feed consisting of the lignocellulosic liquid stream and intermediate fossil stream in the extraction section takes place at a weight ratio between 0.5 and 10.

2. The coprocessing as claimed in claim 1, comprising: separating the stream of raffinate with solvent into a stream of recovered solvent and a stream of asphaltic residue in a separation section.

3. The coprocessing as claimed in claim 1, wherein said lignocellulosic liquid stream consists of bio-oil.

4. The coprocessing as claimed in claim 1, wherein said intermediate fossil stream consists of vacuum residue.

5. The coprocessing as claimed in claim 1, wherein said hydrocarbon solvent is derived from oil refining processes.

6. The coprocessing as claimed in claim 1, wherein said solvent of hydrocarbons is selected from liquefied petroleum gas (LPG) and pentane.

7. The coprocessing as claimed in claim 1, wherein said stream of recovered solvent is recycled to the extraction section, in which the solvent of hydrocarbons is mixed with the recovered solvent stream.

8. The coprocessing as claimed in claim 7, wherein said contact between the mixture of the solvent streams and the combined feed consisting of the lignocellulosic liquid stream and intermediate fossil stream in the extraction section takes place at a weight ratio between 0.5 and 10.

9. The coprocessing as claimed in claim 7, wherein said contacting between said mixture of the solvent streams and the combined feed in the extraction section takes place in the temperature range between 60° C. and 120° C. and in the pressure range between 100 and 10 000 kPa.

10. The coprocessing as claimed in claim 7, wherein the weight ratio is between 3 and 6.

11. The coprocessing as claimed in claim 1, wherein said lignocellulosic liquid stream corresponds to 0.1 to 99.9 wt % relative to the amount of total feed added to the extraction section.

12. The coprocessing as claimed in claim 11, wherein said lignocellulosic liquid stream corresponds to 10 and 75 wt % relative to the amount of total feed added to the extraction section.

13. The coprocessing as claimed in claim 1, wherein said lignocellulosic liquid stream is derived from natural raw materials selected from starch, cellulose and hemicellulose obtained from leaves and bagasse, and sugars.

14. The coprocessing as claimed in claim 1, wherein said lignocellulosic liquid stream is obtained from the pulp and paper industry from a Kraft route.

15. The coprocessing as claimed in claim 1, wherein said deasphalted oil stream is mixed with an intermediate fossil stream in said conversion section or before it is sent to the conversion section in a proportion in the range from 30 to 70 wt %, based on the weight of the total feed fed into the conversion section.

16. The coprocessing as claimed in claim 1, wherein a product from the reaction section is a stream comprising a cracked effluent and a spent catalyst, in which said product is sent to the rectification section for separating the cracked effluent from the spent catalyst.

17. The coprocessing as claimed in claim 16, wherein said stream comprising the cracked effluent and the spent catalyst is separated by cyclones.

18. The coprocessing as claimed in claim 17, wherein said cracked effluent is gasoline, diesel or fuel oil.

19. The coprocessing as claimed in claim 16, wherein said clean spent catalyst is sent to the catalyst regeneration section, in which combustion gases are generated after combustion of the catalyst with an air stream.

20. The coprocessing as claimed in claim 19, wherein the regenerated catalyst returns to the reaction section.

21. The coprocessing as claimed in claim 1, wherein said reaction section operates in a temperature range between 420° C. and 620° C.

* * * * *